US006285522B1

(12) United States Patent
McKenzie et al.

(10) Patent No.: US 6,285,522 B1
(45) Date of Patent: Sep. 4, 2001

(54) ROTATIONAL VIBRATION COMPENSATION USING A DEDICATED SURFACE WITH A CONSTANT FREQUENCY PATTERN

(75) Inventors: Lealon R. McKenzie; D. Brent Douglas; Nathaniel B. Wilson, all of Edmond; Stuart K. Francis, Oklahoma City, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/215,470

(22) Filed: Dec. 18, 1998

Related U.S. Application Data

(60) Provisional application No. 60/088,316, filed on Jun. 5, 1998.

(51) Int. Cl.$^7$ .................................................... G11B 5/596
(52) U.S. Cl. ............................ 360/77.05; 360/60; 360/75
(58) Field of Search ................................. 360/77.05, 60, 360/75, 77.02, 77.08

(56) References Cited

U.S. PATENT DOCUMENTS

| | | |
|---|---|---|
| 4,040,103 | 8/1977 | White . |
| 4,297,734 | 10/1981 | Laishley et al. . |
| 4,692,915 | 9/1987 | Moriya et al. . |
| 4,799,112 | 1/1989 | Bremmer et al. . |
| 4,914,644 | 4/1990 | Chen et al. . |
| 4,947,093 | 8/1990 | Dunstan et al. ............. 360/73.03 X |
| 5,036,506 | 7/1991 | Bierhoff . |
| 5,109,307 * | 4/1992 | Sidman ............................. 360/77.05 |
| 5,235,472 | 8/1993 | Smith ..................................... 360/60 |
| 5,251,484 | 10/1993 | Mastache . |
| 5,254,920 | 10/1993 | Agarwal et al. . |

(List continued on next page.)

FOREIGN PATENT DOCUMENTS

| | | |
|---|---|---|
| 0 264 535 A2 | 4/1988 | (EP) . |
| 0 306 715 A1 | 3/1989 | (EP) . |
| 0 658 894 A1 | 6/1995 | (EP) . |

(List continued on next page.)

OTHER PUBLICATIONS

White and Tomizuka, "Increased Disturbance Rejection in Magnetic Disk Drives by Acceleration Feedforward Control", Department of Mechanical Engineering, University of California, Berkeley, CA 94720–1740, 13$^{th}$ Triennial World-Congress, San Francisco, USA, 1996.

Abramovitch, "Rejecting Rotational Disturbances on Small Disk Drives Using Rotational Accelerometers", Storage Technologies Department, Hewlett–Packard Laboratories, Alto, CA 94304–1126, 13$^{th}$ Triennial World Congress, San Francisco, USA, 1996.

* cited by examiner

*Primary Examiner*—David Hudspeth
*Assistant Examiner*—James L Habermehl
(74) *Attorney, Agent, or Firm*—Crowe & Dunlevy

(57) ABSTRACT

An apparatus and method for minimizing the effects of rotational vibration upon a disc drive having first and second heads supported adjacent first and second disc recording surfaces, respectively. A frequency modulation (FM) demodulator generates a rotational velocity signal indicative of application of rotational vibration to the base deck in relation to changes in frequency of a readback signal generated from a circumferentially extending frequency pattern written to the first disc recording surface at a constant frequency. A servo circuit controllably positions the first and second heads in response to servo information stored on the second disc recording surface and the rotational velocity signal from the FM demodulator. The servo circuit further interrupts a data transfer operation between the second disc recording surface and a host device when a magnitude of the rotational velocity signal exceeds a predetermined threshold.

15 Claims, 7 Drawing Sheets

U.S. PATENT DOCUMENTS

| | | | |
|---|---|---|---|
| 5,299,075 | 3/1994 | Hanks | 360/77.02 |
| 5,426,545 | 6/1995 | Sidman et al. | 360/78.09 |
| 5,452,612 | 9/1995 | Smith et al. | 360/60 X |
| 5,491,394 * | 2/1996 | Harwood et al. | 360/60 X |
| 5,654,840 | 8/1997 | Patton et al. | 360/75 |
| 5,663,847 | 9/1997 | Abramovitch . | |

FOREIGN PATENT DOCUMENTS

| | | |
|---|---|---|
| 0 675 365 A2 | 10/1995 | (EP) . |
| 2 011 654 A | 7/1979 | (GB) . |

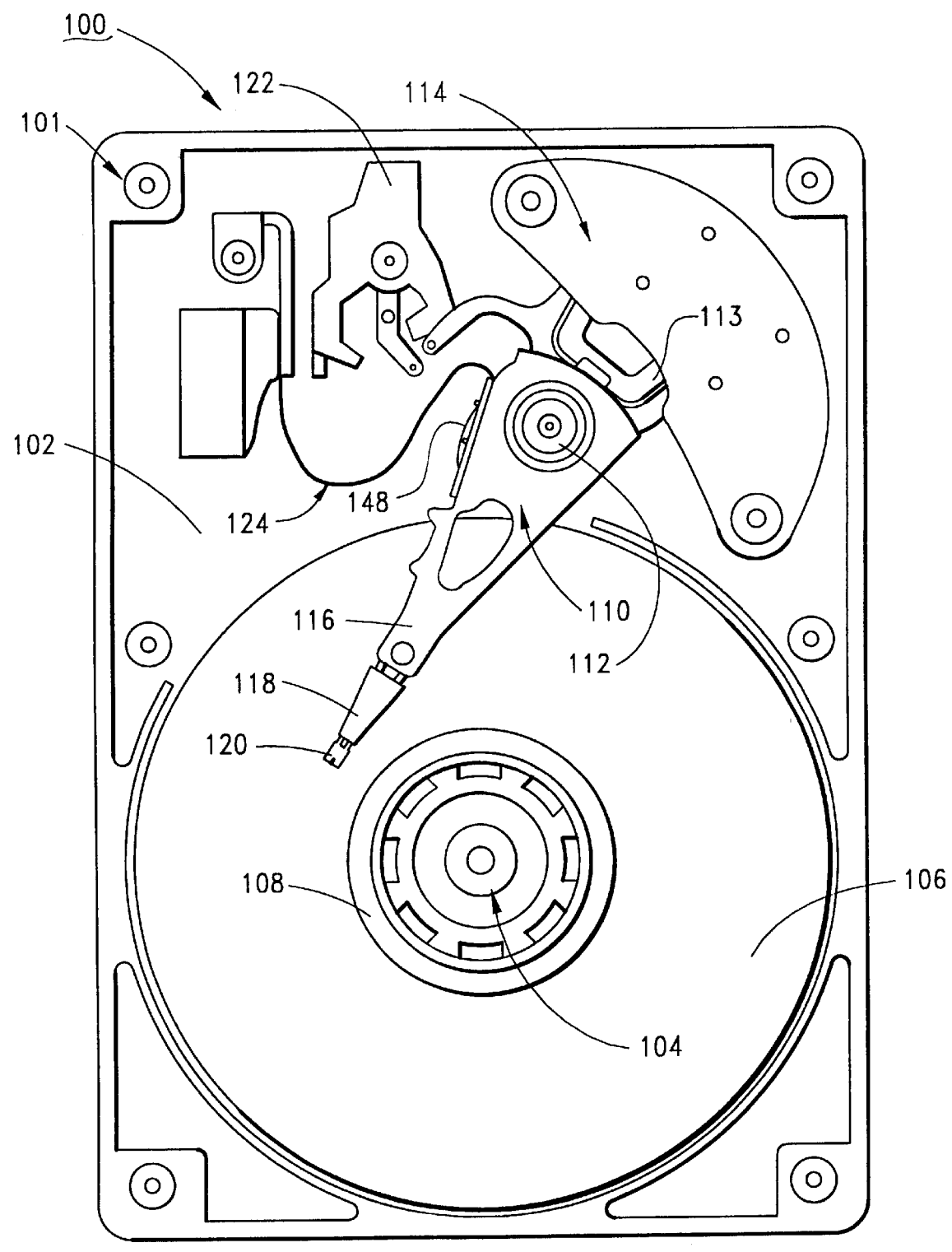
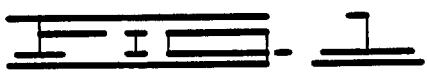

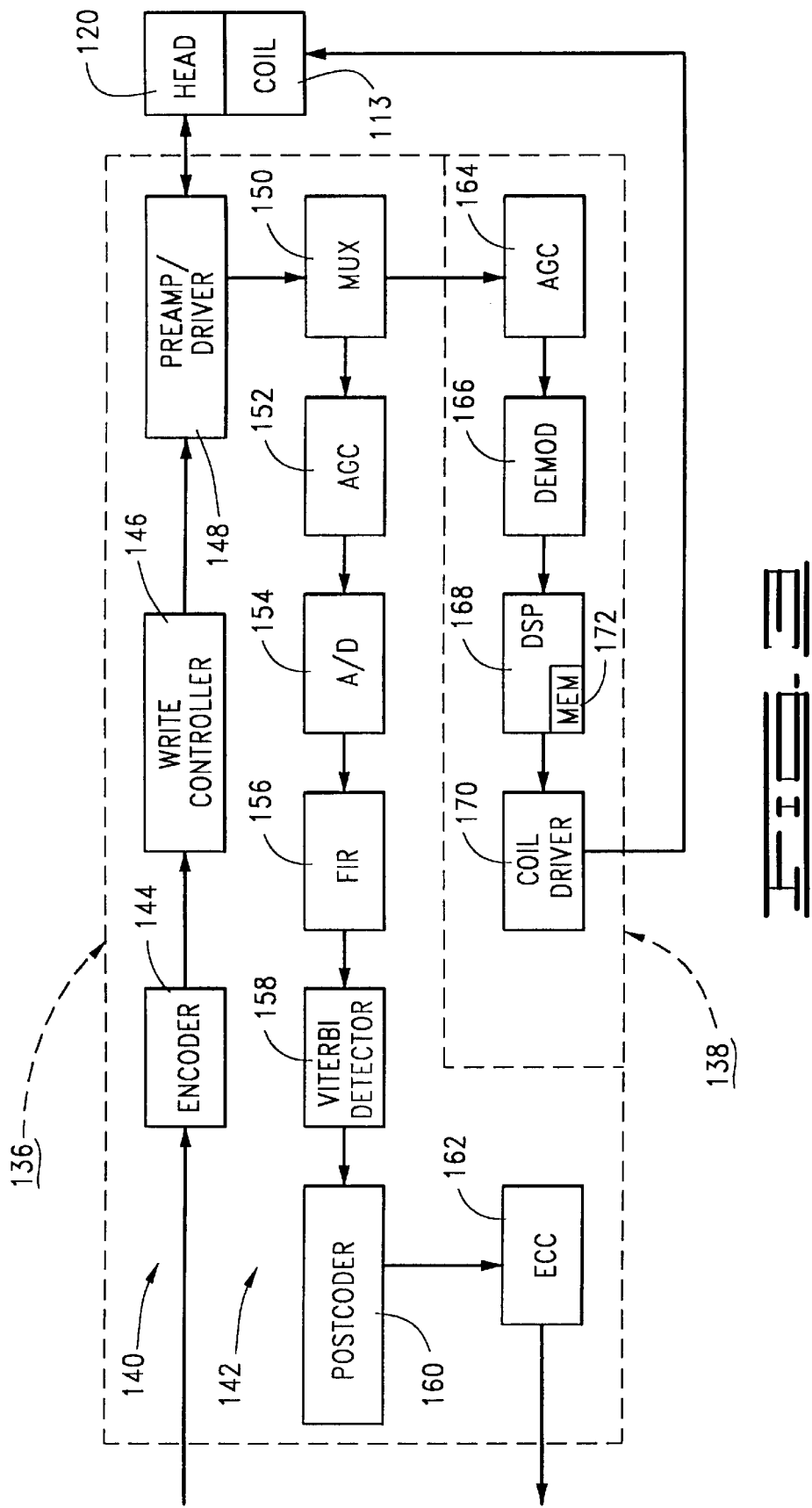

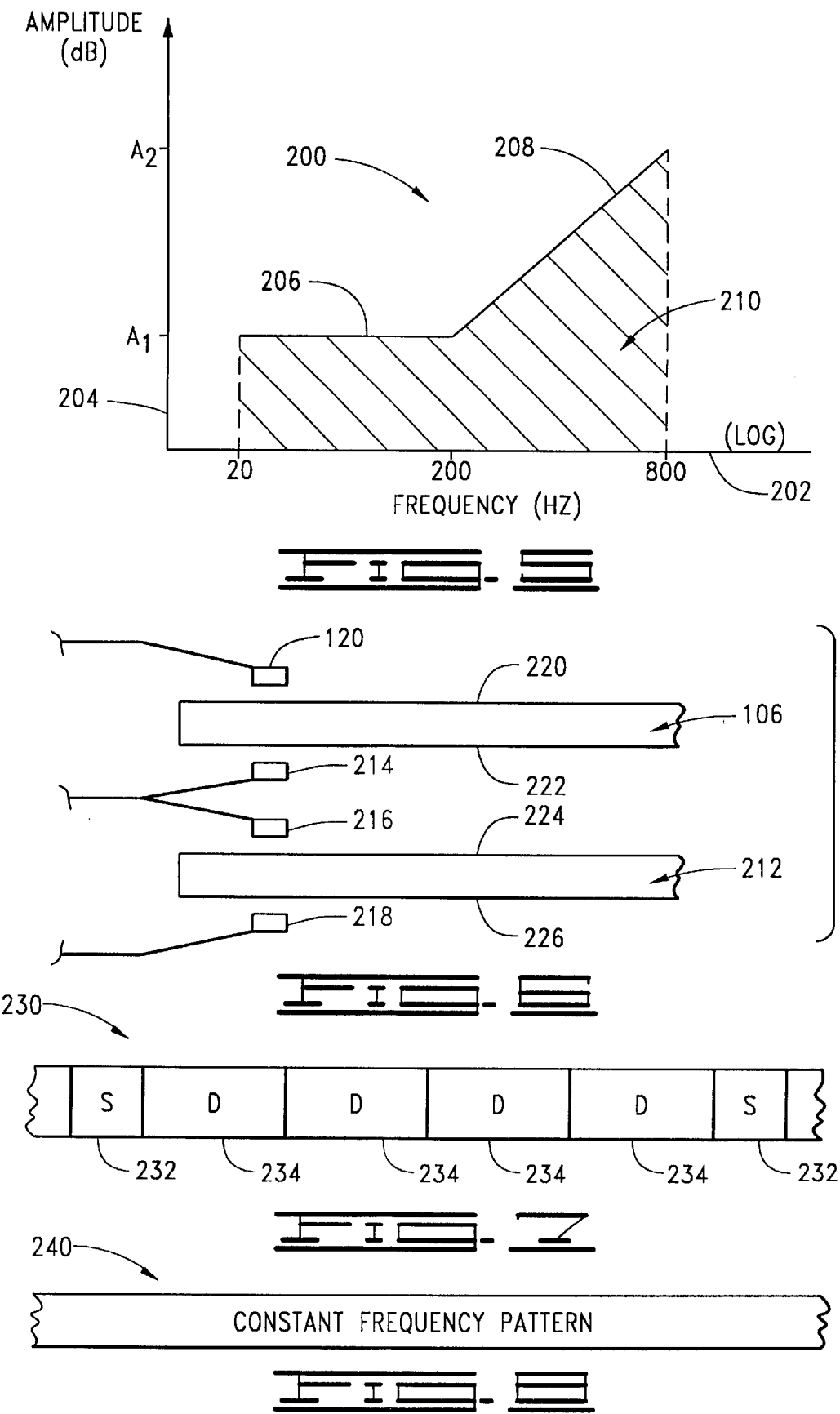

ROTATIONAL VIBRATION COMPENSATION USING A DEDICATED SURFACE WITH A CONSTANT FREQUENCY PATTERN

RELATED APPLICATIONS

This application claims priority to U.S. Provisional Application No. 60/088,316 entitled USING AN FM DEMODULATOR TO MEASURE AND CANCEL ROTATIONAL VIBRATION IN A DISC DRIVE, filed Jun. 5, 1998, and is related to the following concurrently filed U.S. Patent Applications: application Ser. No. 09/216,322 entitled ROTATIONAL VIBRATION COMPENSATION USING AN OPTICAL VELOCITY SENSOR and application Ser. No. 09/216,326 entitled ROTATIONAL VIBRATION COMPENSATION USING A FIXED HEAD AND A CONSTANT FREQUENCY PATTERN.

FIELD OF THE INVENTION

This invention relates generally to the field of disc drive storage devices, and more particularly, but not by way of limitation, to improving data transfer performance of a disc drive by detecting and compensating rotational vibration by demodulating a frequency pattern written to a disc recording surface at a constant frequency.

BACKGROUND OF THE INVENTION

Disc drives are digital data storage devices which enable users of computer systems to store and retrieve large amounts of data in a fast and efficient manner. Disc drives of the present generation have data storage capacities in excess of several gigabytes (GB) and can transfer data at sustained rates of several megabytes (MB) per second.

A typical disc drive is provided with a plurality of magnetic recording discs which are mounted to a rotatable hub of a spindle motor for rotation at a constant, high speed. An array of read/write heads are disposed adjacent surfaces of the discs to transfer data between the discs and a host computer. The heads are radially positioned over the discs by a closed loop, digital servo system, and are caused to fly proximate the surfaces of the discs upon air bearings established by air currents set up by the high speed rotation of the discs.

A plurality of nominally concentric tracks are defined on each disc surface. A preamp and driver circuit generates write currents that are used by the head to selectively magnetize the tracks during a data write operation and amplifies read signals detected by the head during a data read operation. A read/write channel and interface circuit are operably connected to the preamp and driver circuit to transfer the data between the discs and the host computer.

A rigid housing is provided to support the spindle motor and the actuator, with the housing cooperating with a top cover to form an internal controlled environment to minimize particulate contamination of the discs and heads. A printed circuit board is mounted adjacent an exterior surface of the housing to accommodate various disc drive control electronics, including the aforementioned servo circuit, read/write channel and interface circuit.

Disc drives are often used in a stand-alone fashion, such as in a typical personal computer (PC) or portable data processing/communication device where a single disc drive is utilized as the primary data storage peripheral. However, in applications requiring vast amounts of data storage capacity or high input/output (I/O) bandwidth, a plurality of drives are often arranged into a multi-drive array, sometimes referred to as a RAID ("Redundant Array of Inexpensive Discs"; also "Redundant Array of Independent Discs"). A seminal article proposing various RAID architectures was published in 1987 by Patterson et al., entitled "A Case for Redundant Arrays of Inexpensive Discs (RAID)", Report No. UCB/CSD 87/391, December 1987, Computer Science Division (EECS), University of California, Berkeley, Calif.

Since their introduction, RAIDs have found widespread use in a variety of applications requiring significant data transfer and storage capacities. It is presently common to incorporate several tens, if not hundreds, of drives into a single RAID. While advantageously facilitating generation of large scale data storage systems, though, the coupling of multiple drives within the same enclosure can also undesirably increase the effects of vibrations from excitation sources within the drives, such as spindle motors used to rotate the discs and actuators used to move the heads to various tracks on the discs. Such vibrations can be transmitted from drive to drive through chassis mounts used to secure the drives within the enclosure.

Vibrational components can be characterized as being either translational or rotational in nature. Translational vibrations tend to move a disc drive housing back and forth along a plane of the drive, whereas rotational vibrations tend to rotate a disc drive housing about an axis normal to a plane of the drive. Translational vibrations will generally have little effect upon the ability of the actuator to maintain the heads at a selected position with respect to the discs, as the discs and the actuator will both respond to the movement induced by such translational vibrations. However, such is not true with rotational vibrations.

Even with a nominally balanced actuator, rotational vibrations will tend to move the discs relative to the actuator because the actuator, acting as a free body, remains essentially undisturbed due to inertial effects while the discs, mounted to the housing, are displaced by imparted rotational vibration. When sufficiently severe, such movement can cause an "off-track" condition whereby a head is moved away from a selected track being followed. As will be recognized, an off-track condition can adversely affect the ability of the drive to transfer data between the discs and host device.

The problems associated with rotational vibrations are well known in the disc drive art. Compensation attempts have included use of sensors that can detect the presence of rotational vibration in a disc drive, such as discussed in U.S. Pat. No. 5,235,472 issued Aug. 10, 1993 to Smith, assigned to the assignee of the present invention. Efforts to both detect and compensate rotational vibration using feedforward control include discussions by White and Tomizuka, "Increased Disturbance Rejection in Magnetic Disk Drives by Acceleration Feedforward Control," and Abramovitch, "Rejecting Rotational Disturbances on Small Disk Drives Using Rotational Accelerometers." Both of these papers were presented at the $13^{th}$ Triennial World Congress, San Francisco, U.S.A., 1996.

While operative, there are limitations with these and other prior art approaches to minimizing the effects of rotational vibration in a disc drive. Sensors that specifically detect rotational vibration are commercially available, but are often prohibitively expensive for use in low cost disc drive designs and require active testing in a test bed to properly calibrate. Such sensors may include a piezoelectric polymer film disposed between metallic layers that detects rotational vibration in response to torsion induced on the film, as disclosed by the aforementioned Smith U.S. Pat. No. 5,235, 472; another construction uses multiple piezoelectric transducers within a single component enclosure to detect rotation in relation to differences in detected motion among the transducers.

Alternatively, rotational sensors can be formed from two or more discrete linear accelerometers which detect rotational vibration in response to differences in the detected motion between the devices. While potentially less expensive to implement than an integrated rotational sensor, commercially available discrete linear accelerometers (piezo or similar construction) can have significant part-to-part output gain variation characteristics, making such unsuitable for use in a drive to detect rotational vibration without special screening and trimming operations to obtain matched sets of accelerometers.

By way of example, the aforementioned White et al. and Abramovitch references are illustrative of conventional approaches requiring use of relatively precise (and therefore expensive) accelerometers, as well as a calibration routine requiring use of a shaker table to impart vibrations of known characteristics. Such considerations make these approaches undesirable for high volume disc drive manufacturing, and prevent future adaptation of the response characteristics of a given drive to its subsequent field environment.

These references are also limited to compensating for rotational effects and do not directly address translational effects. Significantly, though, translational effects have also been found to contribute to off-track errors due to actuator imbalance (i.e., dynamic imbalance about the actuator rotational axis) and non-zero actuator bearing frictional forces. In practice, induced vibration is seldom purely rotational or translational, but rather usually includes a combination of both.

Moreover, the movement of a track relative to a head as a result of the application of rotational vibration will typically comprise both radially directed acceleration (i.e., along a radius of the discs) and tangentially directed acceleration (i.e., with respect to the axis of disc rotation). The radially directed acceleration component will tend to shift the location (axis) in space about which the discs rotate, whereas the tangentially directed acceleration will tend to change the rotational speed of the discs. The foregoing references accordingly only detect the radially directed acceleration components of a rotational vibration event, and ignore these tangentially directed acceleration effects.

Accordingly, as disc drive track densities and performance requirements continue to increase, there remains a continual need for improved approaches in the art to compensating for the effects of vibration in a disc drive using inexpensive and easily configured vibration sensor circuitry.

SUMMARY OF THE INVENTION

The present invention provides an apparatus and method for minimizing the effects of rotational vibration on a disc drive.

As exemplified by presently preferred embodiments, the disc drive includes a base deck supporting a rotary actuator which in turn supports first and second moveable heads adjacent first and second disc recording surfaces, respectively.

A frequency modulation (FM) demodulator, coupled to the first head, generates a rotational velocity ($V_{ROT}$) signal indicative of application of rotational vibration to the base deck in relation to changes in frequency of a readback signal generated from a circumferentially extending frequency pattern written to the first disc recording surface at a constant frequency. That is, tangentially directed components of rotational vibration induce changes in the rotational speed of the first disc recording surface, and these changes appear as a varying frequency component in the readback signal which is frequency demodulated by the FM demodulator.

A servo circuit, operably coupled to the second head, controllably positions the first and second heads through the application of current to a coil of the actuator in response to servo information stored on the second disc recording surface (read by the second head) and the rotational velocity $V_{ROT}$ signal from the FM demodulator (from the first head). The rotational velocity $V_{ROT}$ signal is accordingly fedforward into the servo circuit, maximizing the ability of the servo circuit to compensate for the rotational vibration applied to the drive. The servo circuit further interrupts the transfer of data between the second disc recording surface and a host device (such as a personal computer) when a magnitude of the rotational velocity signal exceeds a predetermined threshold.

An optimum value of a gain ($K_{FM}$) is preferably applied by the servo circuit to minimize the effects of rotational vibration on the disc drive while operating the disc drive in a rich vibrational environment. Preferably, this environment is established by mechanically coupling the disc drive to a plurality of additional drives and allowing excitation sources within the drives to establish both translational and rotational vibration components.

These and various other features as well as advantages which characterize the present invention will be apparent from a reading of the following detailed description and a review of the associated drawings.

BRIEF DESCRIPTION OF THE DRAWINGS

FIG. 1 provides a top plan view of a disc drive constructed in accordance with preferred embodiments of the present invention.

FIG. 3 shows a functional block diagram for the communication channel and servo circuit of FIG. 2.

FIG. 5 provides a graphical representation of a typical rotational acceleration specification for a disc drive such as that shown in FIG. 1.

FIG. 6 shows an elevational representation of a pair of discs and associated heads from the disc drive of FIG. 1, the heads being used to transduce magnetically stored data on recording surfaces of the discs.

FIG. 7 provides a representation of a portion of a data recording track illustrating the manner in which servo fields are interspersed among data fields on data recording surfaces of the disc drive of FIG. 1.

FIG. 8 provides a representation of a portion of a rotational vibration recording surface, illustrating the manner in which a constant frequency pattern (i.e., a frequency pattern written at a constant frequency) is circumferentially disposed on the rotational vibration recording surface in accordance with a preferred embodiment.

DETAILED DESCRIPTION

Figure 2:
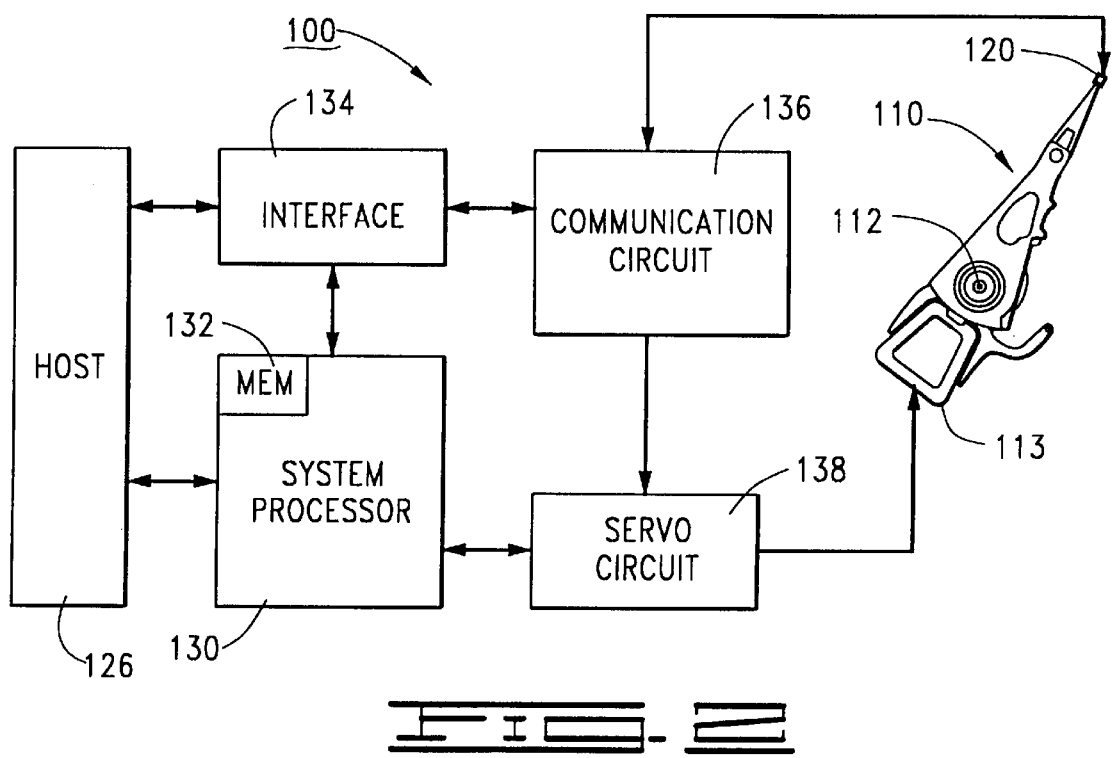
FIG. 2 provides a functional block diagram of relevant portions of the disc drive of FIG. 1.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) which is mounted to the underside of the HDA and is thus not visible in FIG. 1. The PWA includes electronics used to control the operation of the HDA 101, as discussed below.

A top cover, omitted from FIG. 1 to reveal interior portions of the HDA 101, mates with a base deck 102 of the HDA 101 to provide an environmentally controlled environment for the HDA 101. A spindle motor (generally designated at 104) is supported by the base deck 102 and rotates a plurality of axially aligned discs at a constant high speed, with the topmost disc being designated at 106. A disc clamp 108 secures the discs to the spindle motor 104 in a conventional manner.

The discs include recording surfaces (not separately identified in FIG. 1) to which user data are written by way of a rotary actuator 110, which rotates about a cartridge bearing assembly 112 in response to the application of current to a coil (113, a portion of which is visible in FIG. 1) of a voice coil motor (VCM) 114. The actuator 110 includes a plurality of rigid arms 116, each of which supports a corresponding flexible suspension assembly 118. Each suspension assembly 118 in turn supports a head (the topmost of which being identified at 120) over the recording surfaces of the discs (such as 106) by an air bearing established by air currents set up by the high speed rotation of the discs 106. The heads are preferably characterized as magneto-resistive (MR) heads, each having a thin film inductive write element and an MR read element.

A latch assembly 122 secures the actuator 110 when the disc drive 100 is deactivated, and a flex circuit assembly 124 facilitates electrical interconnection between the actuator 110 and the disc drive PWA.

Referring to FIG. 2, shown therein is a generalized functional block diagram of relevant portions of the disc drive 100 of FIG. 1, including circuitry disposed on the aforementioned disc drive PWA. The disc drive 100 is shown in FIG. 2 to be operably coupled to a host device 126 (such as a personal computer) with which the disc drive 100 is associated.

A system processor 130 of the disc drive 100 provides top level drive operational control. Programming and parameter values utilized by the system processor 130 are stored in drive processor memory 132 (MEM), which preferably comprises both volatile and non-volatile memory devices such as dynamic random access memory (DRAM) and flash memory. An interface circuit 134 includes a data buffer (not separately shown) for the temporary buffering of transferred data, and a sequence controller ("sequencer", also not separately shown) which directs the operation of the disc drive 100 during data transfer operations.

FIG. 2 further shows a communication circuit 136 operably coupled to the interface circuit 134 and to the head 120, with the communication circuit 136 controlling the transfer of data between the disc 106 and the host device 126. A servo circuit controls the radial position of the head 120 through the controlled application of current to the coil 113.

FIG. 3 provides a functional block diagram of the communications circuit 136 and the servo circuit 138 of FIG. 2. The communications circuit 136 includes both a write channel (generally designated at 140) to control the storage of data to the disc 106 and a read channel (generally designated at 142) to control the retrieval of the data from the disc 106 back to the host device 126.

The write channel 140 comprises an encoder 144 which, upon receipt of data from the interface circuit 134, encodes the data with run length-limited and error correction code (ECC) encoding to facilitate clock recovery and recovered data integrity. The encoded data are provided to a write controller 146, which serializes the encoded data to generate control signals used by a preamp/driver circuit 148 to apply a time-varying write current to the head 120 to write the encoded data to the disc 106. As shown in FIG. 1, the preamp/driver circuit 148 is located within the HDA 101 and mounted to the actuator 110.

Continuing with FIG. 3, the read channel 142 receives readback signals from the head 120 which, after preamplification by the preamp/driver circuit 148, are provided by a multiplexor (MUX) 150 to an automatic gain control (AGC) circuit 152, which controllably adjusts the amplitudes of the signals to a level appropriate for remaining portions of the read channel 142.

The signals output by the AGC circuit 152 are converted to a sequence of digital samples using a flash analog-to-digital (A/D) converter 154. A finite response filter (FIR) 156 filters the digital samples to a selected class of partial-response, maximum likelihood (PRML) filtering, such as EPR-4. A Viterbi detector 158 decodes the original encoded sequence from the FIR 154 and a postcoder 160 removes the RLL encoding and applies other signal conditioning. Finally, an error correction code (ECC) circuit 162 applies on-the-fly error detection and correction to output the originally stored data to the interface circuit 134 (FIG. 2), for subsequent transfer to the host device 126.

FIG. 3 further shows the servo circuit 138 to include an AGC 164 which, like the AGC 152, controllably adjusts the amplitudes of readback servo signals read by the head 120 to a level appropriate for remaining portions of the servo circuit 138. A demodulator circuit 166 conditions the readback servo signals, including conversion to digital form, for processing by a digital signal processor (DSP) 168.

The DSP 168 controls the operation of the servo circuit 138 in response to commands issued by the system processor 130 (FIG. 2). During a track following mode of operation, the DSP 168 generates a position error signal (PES) indicative of the position of the head 120 relative to the followed track and, in response to a desired position for the head 120, outputs a current command signal to a coil driver 170 which adjusts the amount of current applied to the coil 113 to maintain the head in a desired relation with the track. During a seek, the DSP 168 applies current to the coil to first accelerate and then decelerate the head 120 from an initial track to a destination track in accordance with a velocity profile, indicative of the desired velocity trajectory for the head during the seek. Programming for the DSP 168 is provided in DSP memory (MEM) 172, including programming used to carry out a preferred embodiment of the present invention as discussed below. It will be recognized that the architecture set forth by FIG. 3 is for purposes of illustration and is not necessarily limiting, to the scope of the invention as claimed hereinbelow.

Figure 4:
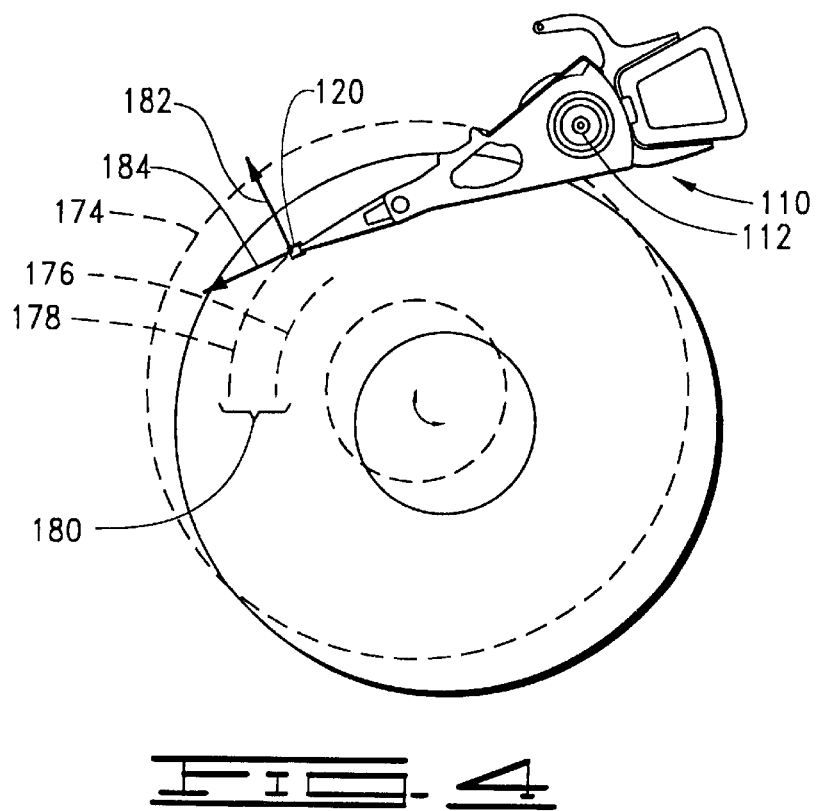
FIG. 4 shows how rotational vibration can cause head/disc displacement in the disc drive.

Having concluded an overview of FIGS. 1–3, it will now be helpful to discuss the manner in which rotational vibration can adversely affect the operation of the disc drive 100, and to this end FIG. 4 has been provided which shows a top view representation of the actuator 110 and the disc 106 of FIG. 1. More particularly, FIG. 4 shows, in exaggerated form, the resulting displacement of the disc 106 to a position 174 in response to the application of rotational vibration to the disc drive 100.

From a review of FIG. 4, it can be readily discerned that the rotational vibration causes movement of the disc drive base deck 102 (FIG. 1) about an axis normal to a plane along which the top disc 106 extends. The discs accordingly move along with the base deck 102 due to the coupling of the discs to the base deck 102 by way of the spindle motor 104 (FIG. 1). However, the actuator 110, having the capability of rotating relative to the base deck 102, acts as a free body and remains essentially stationary in space. In other words, the rotational vibration causes the discs to rotate out from underneath the actuator 110.

The resulting radial displacement of the disc 106 relative to the head 120 causes the head position to move from a first track 176 to a second track 178, with the tracks 176 and 178 separated by a distance identified at 180. As will be appreciated, such displacement can adversely affect a data transfer operation between the head 120 and the track 176; for example, should the displacement occur during a write operation, data intended to be written to the track 176 would be overwritten onto track 178, irretrievably corrupting the data stored on track 178.

In accordance with the foregoing discussion, however, it will be noted that the rotational event actually induces two separate types of motion between the head 120 and the disc 106, the first being characterized as radial in nature and the second being characterized as tangential in nature. The radial component (indicated by vector 182) generally lies along the direction of displacement of the disc 106 and primarily induces the resulting positional change from track 178 to 176. However, the tangential component (indicated by vector 184) causes a change in the rotational speed of the disc 106; that is, the rate at which the rotating disc 106 passes under the head 120 will change in relation to the magnitude of the rotational vibration event. It is to the detection of such changes in rotational speed via this tangential component 184 that the present invention (as preferably embodied herein and as claimed below) is generally directed, as will now be discussed in detail beginning with FIG. 5.

FIG. 5 shows a graphical representation of an operating curve 200 which illustrates a typical design specification for a disc drive such as at 100 in terms of the ability to reject externally applied rotational vibration. That is, a disc drive designer will typically be presented with an overall design specification (based upon customer requirements) indicative of the rotational vibration frequency and amplitude range(s) over which a resulting disc drive design must be able to operate without error. The operating curve 200 is illustrative of one such specification, and is plotted against a (log) x-axis 202 indicative of frequency and a y-axis 204 indicative of amplitude (dB).

From FIG. 5, it can be seen that the operational frequency range of interest extends from 20 hertz (Hz) to 800 Hz, with the drive 100 being required to operably reject rotational vibration below an amplitude $A_1$ from 20 Hz to 200 Hz (as indicated by segment 206), and to operably reject rotational vibration from 200 Hz to 800 Hz with the amplitude linearly increasing from amplitude $A_1$ to amplitude $A_2$ (as indicated by segment 208). Area 210, defined under the operating curve 200 and bounded by 20 Hz and 800 Hz thereby defines the rejection range wherein the drive 100 must operate error-free, and for reference preferably represents a rotational vibration of 21 radians/second$^2$ (rad/s$^2$). It will be noted that FIG. 5 has been presented merely for illustration of a typical design specification, and to point out that it is from such an initial specification that many of the parameters of the resulting compensation circuitry are preferably selected.

Turning now to FIG. 6, shown therein is an elevational representation of a portion of the disc drive 100, showing the general alignment of multiple discs and heads in the disc drive 100. Heretofore the discussion has primarily involved the top head 120 and top disc 106 (as shown in FIGS. 1 and 4), but for purposes of further explanation it is now desirable to identify an additional disc 212 and additional heads 214, 216 and 218. It is common for disc drives such as 100 to include a larger number of discs and heads (such as 10 discs and 20 heads, respectively), but for purposes of the present discussion only the two discs 106, 212 and the corresponding heads 120, 214, 216, 218 will be particularly addressed. Except as otherwise discussed herein, it will be understood that the heads 120, 214, 216, 218 are nominally aligned, supported and rotated by the actuator 110 and transduce signals to and from respective recording surfaces 220, 222, 224 and 226 on the discs 106, 212.

As discussed in greater detail below, a selected one of the recording surfaces 220, 222, 224 and 226 is set apart for use as a constant frequency pattern surface, with data being stored and transferred in an otherwise conventional fashion with the remaining recording surfaces. It is not particularly important which of the recording surfaces is selected to store the constant frequency pattern, and a variety of factors may make one surface more desirable than the others. For the purposes of the present discussion, though, it will be contemplated that the top recording surface 220 of disc 106 is provided with the constant frequency pattern and the remaining surfaces 222, 224, 226 are configured as "normal" recording surfaces.

As a result, the recording surfaces 222, 224 and 226 will each comprise a general format as shown in FIG. 7, which shows a portion of a track 230 comprising a plurality of servo (S) fields 232 interspersed with user data (D) fields 234. The servo fields 232 are preferably formed during a servo track write operation during manufacturing wherein a highly precise servo writer writes the servo information as a plurality of radially extending servo wedges, much like spokes of a wheel. The servo fields 232 contain servo information used to control the position of the associated head (214, 216, 218) in accordance with the discussion presented above with regarding the servo circuit 138 of FIG. 3. The data fields are used to store user data supplied by the host device 126, in accordance with the discussion presented above regarding the communication circuit 136 of FIG. 3, with the data fields 234 being formatted during a disc drive formatting operation. For reference, the disc drive 100 preferably employs zone based recording (ZBR) so that each of the recording surfaces 222, 224, and 226 have a plurality of nominally concentric tracks substantially similar to the track 230, with varying numbers of user data fields 234 between adjacent servo fields 232 based on radius. For a detailed discussion of ZBR techniques, see U.S. Pat. No. 4,799,112 issued Jan. 17, 1989 to Bremmer et al., assigned to the assignee of the present invention.

Unlike the recording surfaces 222, 224 and 226, however, the recording surface 220 receives a constant frequency pattern, a portion of which is represented at 240 in FIG. 8 and which comprises a circumferentially extending pattern written to the recording surface 220 at a predetermined, constant frequency. Although other patterns can be readily used as desired, a suitable pattern is a 2T pattern written across the entire surface (i.e., from an innermost to an outermost diameter of the disc 106).

As an aside, it will be noted that the nominal frequency at which the pattern is read back will be a function of the rotational speed of the disc 106 during such read operation. If the writing of the frequency pattern takes place while the disc 106 is rotated at the nominal operational rotational speed of the discs (such as 7200 revolutions per minute), then the nominal frequency at which the pattern is read back will generally be the same as the writing frequency (ignoring for a moment the effects of rotational vibration). It is common, however, to write certain types of information while the discs are rotated at a rotational speed that is different from the nominal operational rotational speed; for example, the servo information of the servo fields 232 can be preferably written with the discs rotating at a speed of around 1000 revolutions per minute. Thus, it is contemplated that the frequency pattern provided to the recording surface 220 may or may not be written at the same frequency at which it is subsequently nominally read: regardless, the frequency pattern is preferably written so as to provide a readback frequency of nominally 20 megahertz (MHZ) across the entire surface 220. This readback frequency can be readily modified to other suitable values, as desired. The surface 220 can further be divided into a number of zones, each having a different readback frequency, again as desired. However, for each given radius on the recording surface 220, the frequency pattern is written at the same frequency and extends all the way around the angular extent of the disc 106.

At this point it will be appreciated that the disc drive 100 utilizes an embedded servo scheme to control the position of the heads 214, 216, 218 using the servo information from the associated servo fields 232 (FIG. 7) on the recording surfaces 222, 224 and 226. At the same time, the head 120 will generate a readback signal at a frequency determined by the rate at which the recording surface 220 rotates under the head 120. As will be recognized, the disc drive 100 detects rotational vibration in relation to changes in rotational frequency of the recording surface 220.

For purposes of clarity of terminology, the recording surface 220 comprising the circumferentially extending frequency pattern 240 is also herein referred to as a "first disc recording surface" and the corresponding head 120 adjacent the first disc recording surface is also herein referred to as a "sense head." The remaining recording surfaces 222, 224, 226 comprising the servo fields 232 and the data fields 234 are each also referred to as a "second disc recording surface," and the corresponding head 214, 216 or 218 is referred to as a "data head."

Also, although the introductory discussion of FIG. 3 hereinabove generally presented the head 120 as a normal data head configured to transduce both servo and user data information, it will now be clear from the foregoing discussion that, as head 120 has been selected in the present example as being dedicated to the sensing rotational vibration from the constant frequency pattern of the disc recording surface 220, it would now be more accurate to identify the head in FIG. 3 as one of the remaining heads 214, 216, 218. That is, the communication circuit 136 and the servo circuit 138 interact with the data heads 214, 216, 218 to transfer user data and to provide actuator control.

Figure 9:
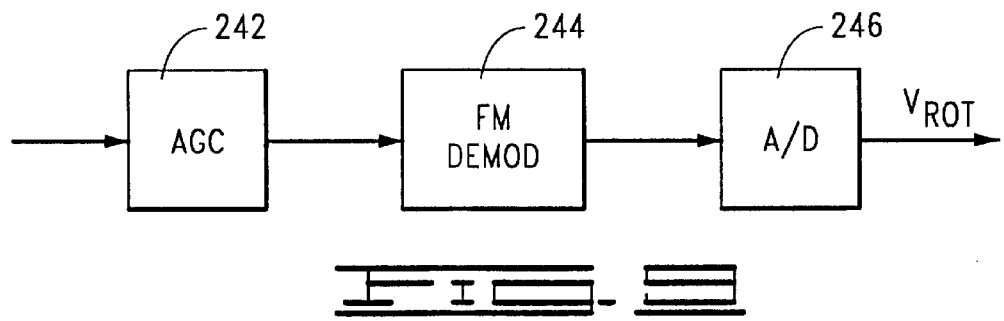
FIG. 9 provides a functional block diagram of a sense circuit which uses a frequency modulation (FM) demodulator to detect rotational vibration in relation to variations in frequency of a readback signal transduced from the constant frequency pattern of FIG. 8 in accordance with a preferred embodiment.

Referring now to FIG. 9, shown therein is additional circuitry of the disc drive 100 used in conjunction with the first disc recording surface 220 to detect rotational vibration applied to the disc drive 100. Particularly, FIG. 9 shows an automatic gain control (AGC) circuit 242, an analog frequency modulation (FM) demodulator circuit 244 and an analog-to-digital (A/D) converter 246, constructed in accordance with a preferred embodiment and preferably located on the aforementioned disc drive PWA.

The AGC circuit 242 is operably coupled to the sense head 120 (FIG. 6) to receive a readback signal therefrom and perform automatic gain control operations in a manner similar to those discussed above for the AGC circuits 152 and 164 of FIG. 3. Although not shown for clarity of illustration, the readback signal from the sense head 120 is preferably preamplified by a preamplifier to provide initial preamplification of the readback signal prior to operation of the AGC circuit 242. In one preferred embodiment, the preamp/driver 148 (FIG. 3) is operably configured to pass readback signals from both the sense head 120 and the data heads 214, 216 and 218; in another preferred embodiment, a separate preamplifier is dedicated for use by the sense head 120. The need and extent of such preamplification, of course, will depend upon the requirements of a given application.

Continuing with FIG. 9, the output from the AGC circuit 242 is supplied to the FM demodulator 244, which outputs an analog signal having a magnitude that changes in relation to changes in frequency in the input signal. For reference, a particularly suitable FM demodulator is the MC3362 supplied by Motorola, Inc. of Phoenix, Ariz., U.S.A.

The output frequency demodulated signal is next passed through the A/D 246 to provide a corresponding digital signal output (i.e., sequence of digital samples) of rotational velocity, denoted as "$V_{ROT}$." As described more fully below, the disc drive 100 monitors the magnitude of the $V_{ROT}$ signal and temporarily interrupts a data transfer operation when this magnitude exceeds a predetermined threshold.

Figure 10:
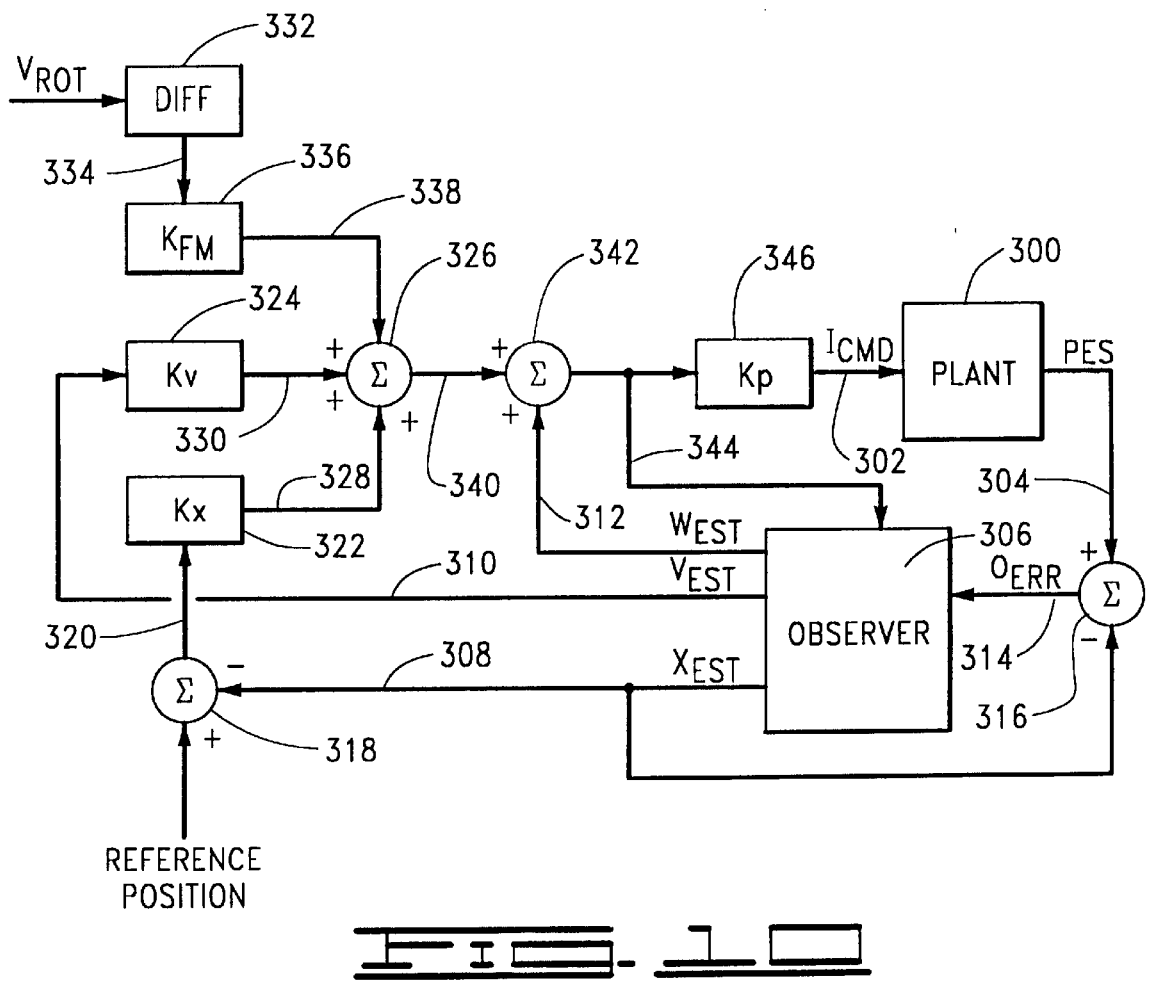
FIG. 10 is a control block diagram representative of the disc drive, illustrating the manner in which the servo circuit of the disc drive uses a rotational velocity signal generated from the FM demodulator of FIG. 9 to minimize the effects of rotational vibration in accordance with a preferred embodiment.

Referring now to FIG. 10, shown therein is a block diagram representation of the operation of the servo circuit 138 in accordance with a preferred embodiment. More particularly, the block diagram representation includes modules existing in programming stored in memory 172 (FIG. 3) and utilized by the DSP 168 in providing positional control while minimizing the effects of rotational vibration upon the drive.

As shown in FIG. 10, a plant block 300 is presented representative of selected electrical and mechanical aspects of the disc drive 100. For reference, the plant 300 generally corresponds to portions of the servo loop established by the servo circuit 138 (see FIG. 3). The plant block 300 receives as an input a current command ($I_{CMD}$) signal on path 302 and, in response, outputs a position error signal (PES) on path 304 indicative of positional error in a selected head (212,214, or 216 respectively, depending upon the head that is presently selected by the disc drive 100).

FIG. 10 further shows an observer block 306, which generally provides a mathematical model of the plant 300 and periodically outputs estimates of head position ($X_{EST}$), velocity ($V_{EST}$) and bias ($W_{EST}$) on paths 308, 310 and 312, respectively. Bias will be understood as indicative of forces that tend to move the heads away from a selected position, such as spring forces applied by the flex circuit 124 (FIG. 1) and windage effects caused by air currents set up by the rotation of the discs 106, 212. The estimates output by the observer 306 are formed in relation to an observer error ($O_{ERR}$) signal on path 314 generated by a summing junction 316 as the difference between the PES and the $X_{EST}$.

The $X_{EST}$ on path 308 is further summed at a summing junction 318 with a reference position (indicative of desired head position) and the output on path 320 is applied to a position gain block 322 having gain $K_X$. The $V_{EST}$ on path 310 is similarly applied to a velocity gain block 324 having gain $K_V$. The outputs of the position and velocity gain blocks 322, 324 are brought to a summing junction 326 by way of paths 328, 330, respectively.

The manner in which the $V_{ROT}$ signal (FIG. 9) is preferably used to control head position (i.e., control the amount of current applied to the coil 113), thereby minimizing the effects of rotational vibration applied to the disc drive 100, will now be discussed. Particularly, FIG. 10 shows the $V_{ROT}$ signal being applied to a differentiator block 332, which differentiates the $V_{ROT}$ signal to provide an acceleration signal on path 334 to a gain block 336 having a gain $K_{FM}$. The gain $K_{FM}$ is preferably selected in a manner to be discussed below, but generally is set to a value that maximizes the ability of the servo circuit 138 to compensate for the effects of rotational vibration on the disc drive 100. The output of the gain block 336 is provided on path 338 and is likewise summed by the summing junction 326.

The output of the summing junction 326 is provided along path 340 to a summing junction 342, which further receives the $W_{EST}$ from the observer 306 on the path 312. The resulting signal, impressed on path 344, is generally proportional to the current to be applied to the coil 113 and is provided to the observer 306 as shown. To maintain the operation of the observer 306 nominally that of the plant 300, however, the signal of path 344 is finally passed through a gain block 346 with gain $K_P$ to generate the aforementioned current command signal $I_{CMD}$.

Figure 11:
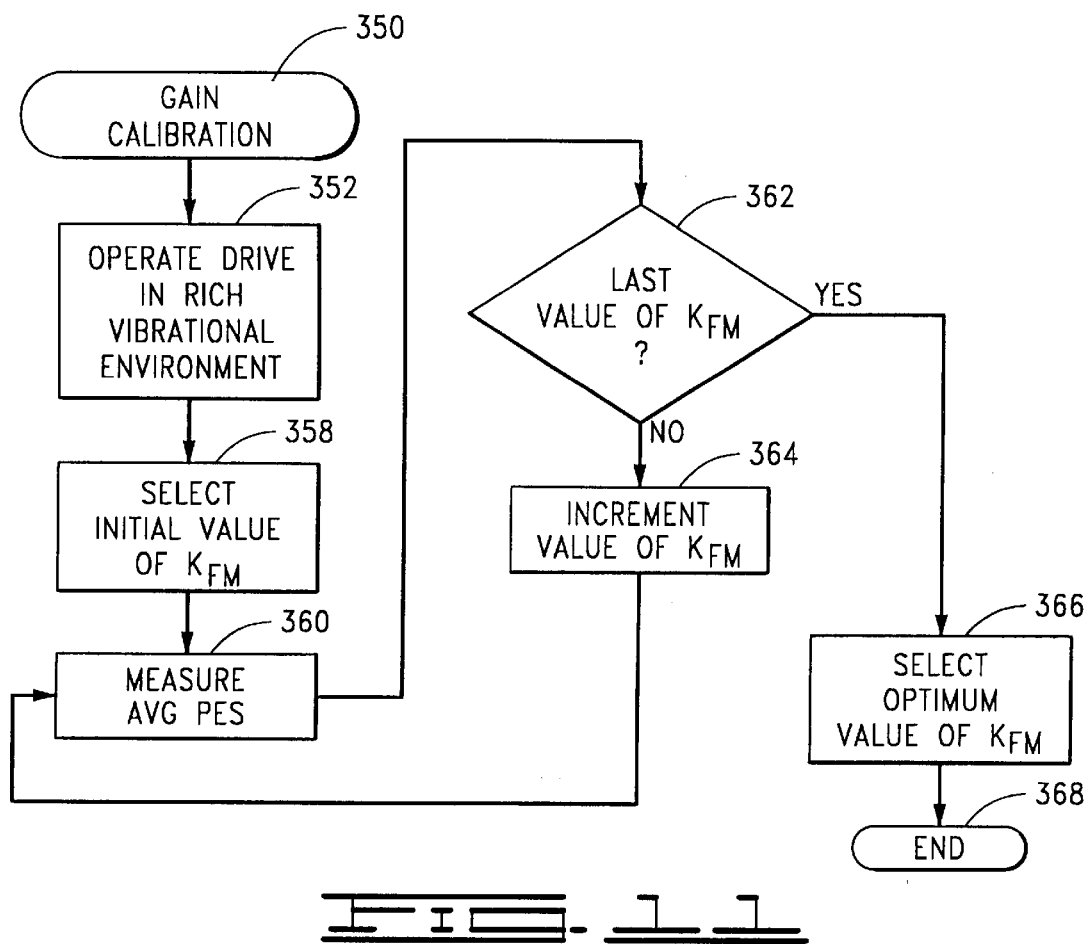
FIG. 11 provides a generalized flow chart for a GAIN CALIBRATION routine, performed to select an optimum value for the $K_{FM}$ gain utilized by the control block diagram of FIG. 10 in accordance with a preferred embodiment.

To present a preferred method for setting the gain $K_{FM}$ of the gain block 336 to an optimum value, FIG. 11 has been provided which shows a general flow chart for a GAIN CALIBRATION routine 350, carried out in accordance with a preferred embodiment of the present invention. The routine of FIG. 11 generally corresponds to programming stored in DSP memory 172 and utilized by the DSP 168. It is contemplated that the routine will be carried out during disc drive manufacturing, but can also be subsequently carried out during data processing use of the disc drive 100 (i.e., by an end-user of the drive).

As shown at step 352, the disc drive 100 is first placed and operated within a rich vibrational environment, wherein a broad spectrum of translational and rotational vibrational components is applied to the disc drive 100. Such an environment is shown schematically in FIG. 12.

Figure 12:
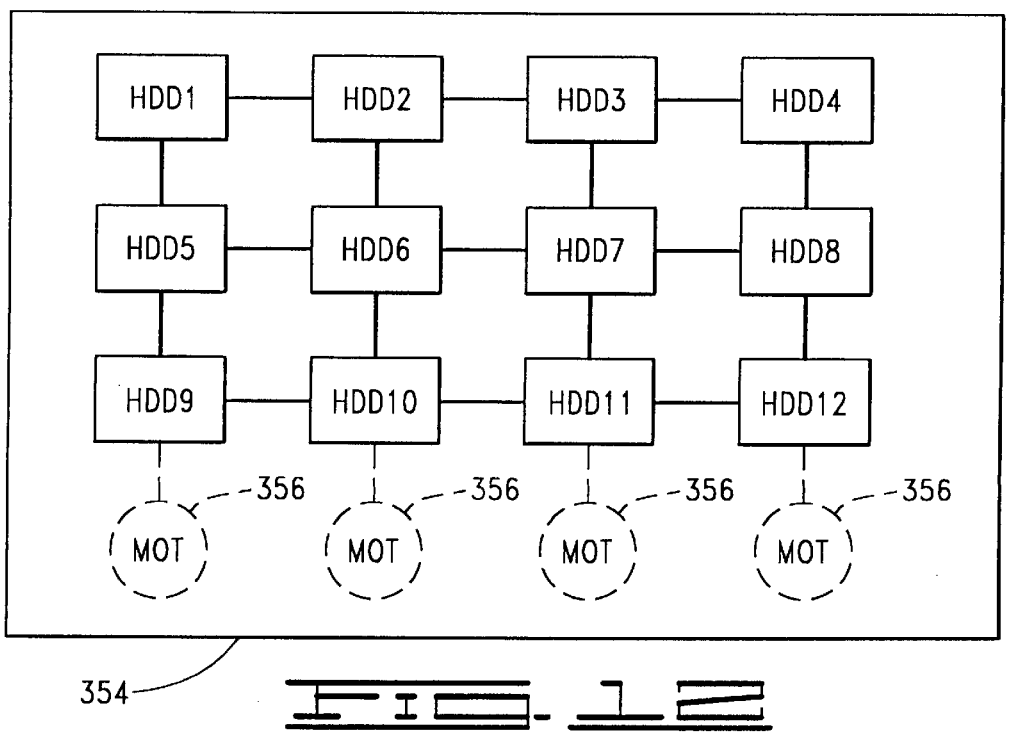
FIG. 12 illustrates an enclosure housing a plurality of mechanically intercoupled disc drives used to generate a rich vibrational environment for the disc drive of FIG. 1.

More particularly, FIG. 12 illustrates an enclosure 354 housing a plurality of hard disc drives (12 in this example, identified as HDD1–HDD12) nominally identical to the disc drive 100 of FIG. 1. The disc drives are mechanically coupled together in such a maimer so as to maximize transfer of vibrational components from drive to drive during operation. The enclosure 354 can correspond to an environmental chamber used to perform manufacturing dynamic burn-in (DBI) testing wherein the drives are operated over an extended period of time (such as 48 hours) while being subjected to a variety of environmental conditions, such as different temperatures, ambient pressures, etc. Alternatively, the enclosure 354 can correspond to a RAID housing so that the disc drives form a multi-drive array and are operated as a single data storage system.

A plurality of mechanical vibration sources 356 such as motors ("MOT") can also be coupled to the disc drives, as shown in FIG. 8. These vibration sources 356 inject additional amounts of vibration into the disc drives, and can represent cooling fans used to enhance convective cooling of the drives (such as commonly used in RAID housings); alternatively, when the routine of FIG. 11 is carried out during DBI, the vibration sources 356 can be motors that are specifically placed within the environmental chamber.

Returning to FIG. 11, the routine next proceeds to identify an optimum value for the gain $K_{FM}$ which results in a minimum average PES magnitude; in other words, the optimum gain setting for $K_{FM}$ minimizes the effects of vibration on head position, as reflected by PES magnitude. This is preferably accomplished by first setting the gain $K_{FM}$ to an initial value, as indicated by step 358, measuring the average PES, step 360, and repeating for each new increment of $K_{FM}$, as indicated by decision step 362 and step 364. Steps 358, 360, 362 and 364 accordingly comprise a sweep of the gain $K_{FM}$ from its minimum to maximum value while measuring the average PES for each increment, using an accumulation function or other suitable methodology to capture the average PES in each case. The optimum value of $K_{FM}$ is next selected at step 366 in relation to the value that provided the minimum average PES, and this optimum value is thereafter used by the gain block 336 (FIG. 10) until the next execution of the routine of FIG. 11. Once the optimum value is selected, the routine ends at step 368.

The routine of FIG. 11 thus presents an efficient methodology for determining the optimum value for the gain $K_{FM}$ and possesses several additional advantages over the prior art. For example, unlike conventional prior art approaches, it is wholly unnecessary to place the disc drive 100 onto a shaker table in order to apply carefully controlled amounts of vibration to the drive; instead, the routine can be carried out during existing conventionally applied manufacturing steps (such as DBI) with little or no modification to the test routine. The rich vibrational environment used to calibrate the gains during manufacturing (i.e., multi-drive DBI chamber) will often be representative of the actual operational environment in which the drive will ultimately be operated, ensuring better correlation between the routine and actual field use.

Moreover, the adaptive capabilities of the routine of FIG. 11 allow the disc drive 100 to further optimize the gains in relation to the vibrations experienced in each particular operational environment. For example, it is contemplated that the routine of FIG. 11 can be performed by the disc drive during field use on a periodic basis to maintain optimal performance of the drive. The routine can also be specifically performed by the drive after the occurrence of a sufficient number of off-track faults, in an effort to better optimize present settings of the drive.

Figures 13, 14:
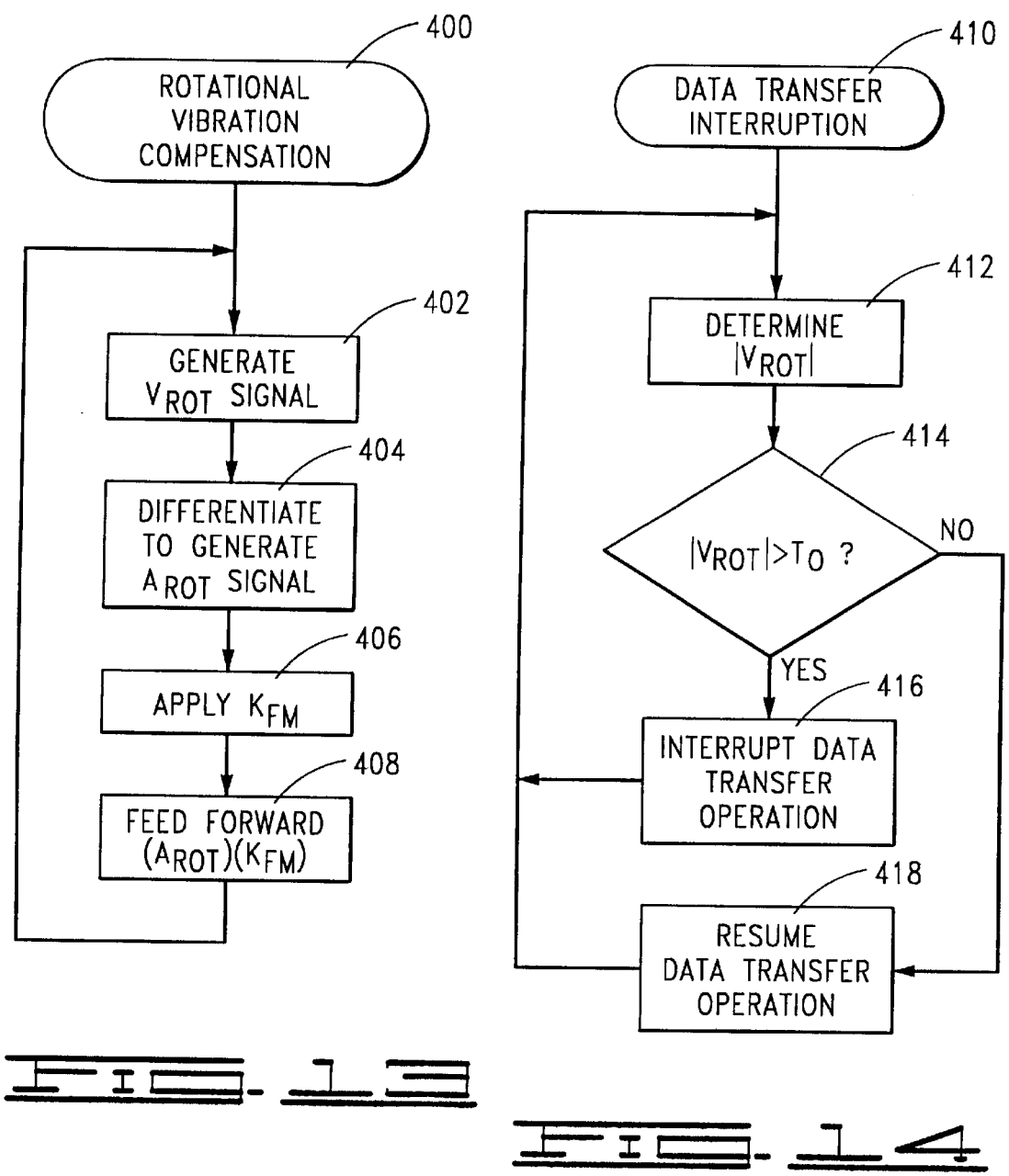
FIG. 13 provides a generalized flow chart for a ROTATIONAL VIBRATION COMPENSATION routine, representative of the operation of the disc drive in minimizing the effects of rotational vibration during operation in accordance with a preferred embodiment.
FIG. 14 is a generalized flow chart for a DATA TRANSFER INTERRUPTION routine, representative of the operation of the disc drive to temporarily interrupt a data transfer operation when detected rotational vibration exceeds an acceptable level as quantified by a predetermined threshold in accordance with a preferred embodiment.

Having completed the foregoing discussion of the manner in which the gain $K_{FM}$ is preferably selected to minimize the effects of rotational vibration, reference is now made to FIG. 13 which sets forth a generalized flow chart for a ROTATIONAL VIBRATION COMPENSATION routine 400, carried out in accordance with a preferred embodiment during operation of the disc drive. The routine of FIG. 13 is preferably performed in conjunction with other normal disc drive operational routines.

Once the $K_{FM}$ gain is properly calibrated, the sense head 120 continually presents the $V_{ROT}$ signal as discussed above. That is, the sense head 120 moves across the first disc recording surface 220 with the remaining heads 214, 216, 218 as current is passed through the actuator coil 113. Each time one of the data heads 214, 216 or 218 is caused to follow a selected track (such as 230, FIG. 7) on the corresponding recording surface 222, 224 or 226, the sense head 120, as enabled, will transduce the constant frequency pattern on the first disc recording surface 220 and output the $V_{ROT}$ signal, which will have a magnitude that changes in relation to changes in the rotational speed of the disc 106. This operation is generally set forth by step 402 in FIG. 13.

Next, the $V_{ROT}$ signal is differentiated to generate the aforementioned acceleration signal, denoted in step 404 of FIG. 13 as $A_{ROT}$. A preferred method for performing this operation was previously discussed with regard to the differentiator block 332 of FIG. 10. It will be noted that during normal operation of the disc drive 100, in the general absence of rotational vibration (and negligible amounts of spindle motor speed variation), the $A_{ROT}$ signal will be nominally zero, and accordingly have an insignificant effect upon the operation of the servo circuit 138.

The gain $K_{FM}$ is next applied to the $A_{ROT}$ signal, step 406 of FIG. 11, as shown by the gain block 336 of FIG. 10. The resulting product $(A_{ROT})(K_{FM})$ is then fedforward into the servo loop, step 408 of FIG. 11, at the summing junction 326 of FIG. 10, to minimize the effects of rotational vibration upon the disc drive 100. The routine of FIG. 13 loops back as shown, thereby continuing in like manner during operation of the drive.

FIG. 14 provides a flow chart for an additional level of programming utilized by the disc drive 100, namely a DATA TRANSFER INTERRUPTION routine 410, which like the routine of FIG. 13, operates in conjunction with other normal disc drive operational routines. However, unlike the ROTATIONAL VIBRATION COMPENSATION routine of FIG. 13 which operates to minimize acceptable levels of rotational vibration (such levels being within the area 210 of FIG. 5), the DATA TRANSFER INTERRUPTION routine of FIG. 14 additionally detects rotational vibration events that exceed the operating curve 200 of FIG. 5, and temporarily halts data transfer to prevent the unintended overwriting or misreading of data to or from the discs 106, 212.

As shown at step 412, the routine of FIG. 14 determines the absolute magnitude of each $V_{ROT}$ signal sample. Each such magnitude is compared to an operational threshold ($T_O$) which corresponds to a maximum acceptable level of rotational acceleration. Consonant with the foregoing discussion of FIG. 5, it will be understood that the threshold $T_O$ can be made a single value, or can alternatively vary with regard to the frequency content of the $V_{ROT}$ signal samples, as desired, to more closely correspond to the operational parameters of FIG. 5.

Regardless, when the magnitude of the $V_{ROT}$ signal exceeds the operational threshold (decision step 414), the flow passes to step 416 wherein the servo circuit 138 temporarily interrupts any data transfer operations of the disc drive 100, until such time that the rotational acceleration is brought back within an acceptable level (as indicated by step 418).

In view of the foregoing discussion, it will now be clear that the present invention is directed to a method and apparatus for minimizing the effects of rotational vibration on a disc drive. As exemplified by a preferred embodiment, the disc drive includes a base deck 102 supporting a rotary actuator 110 supporting first and second heads 120; 214, 216, 218 adjacent first and second disc recording surfaces 220; 222, 224, 226, respectively.

A frequency modulation (FM) demodulator 244 generates a rotational velocity signal step 402 indicative of application of rotational vibration to the base deck in relation to changes in frequency of a readback signal generated from a circumferentially extending frequency pattern 240 written to the first disc recording surface at a constant frequency. A servo circuit 138 controllably positions the first and second heads in response to servo information 232 stored on the second disc recording surface and the rotational velocity signal from the FM demodulator. The servo circuit further interrupts a data transfer operation (step 416) between the second disc recording surface and a host device 126 when a magnitude of the rotational velocity signal exceeds a predetermined threshold (step 414).

For purposes of the appended claims, the terms "circuit" and "block" will be understood to be realizable in either hardware or software, in accordance with the foregoing discussion. The phrase "circumferentially extending frequency pattern written at a constant frequency" and similar such phrases will be understood, consistently with the foregoing discussion, to describe a pattern is one that extends substantially all the way around the disc at each selected radius, such as illustrated for the recording surface 220. Although method steps have been set forth in a particular order, such ordering is not necessarily limiting to the scope of the claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive having a rotary actuator supporting at least first and second heads adjacent first and second disc recording surfaces, respectively, the actuator and the first and second disc recording surfaces supported by a base deck, an apparatus for reducing effects of rotational vibration applied to the base deck, comprising:

a frequency modulation (FM) demodulator, operably coupled to the first head, which generates a rotational velocity signal indicative of application of rotational vibration to the base deck in relation to changes in frequency of a readback signal generated from a circumferentially extending frequency pattern written to the first disc recording surface at a constant frequency;

a servo circuit, operably coupled to the second head and the FM demodulator, which controllably positions the first and second heads in response to servo information stored on the second disc recording surface and the rotational velocity signal from the FM demodulator;

a gain block, operably coupled to the FM demodulator, which applies a gain to the rotational velocity signal to generate an adjusted rotational velocity signal; and a differentiator block, operably coupled to the gain block, which differentiates the adjusted rotational velocity signal to generate a rotational acceleration signal indicative of a tangentially directed acceleration component of the rotational vibration applied to the base deck, wherein the servo circuit selects the gain to reduce error in the positioning of the second head induced by the application of rotational vibration to the base deck.

2. The apparatus of claim 1, wherein the servo circuit interrupts a data transfer operation between the second disc recording surface and a host device associated with the disc drive when a magnitude of the rotational velocity signal exceeds a predetermined threshold.

3. The apparatus of claim 1, wherein the actuator further supports a magnetic coil and wherein the servo circuit uses the rotational acceleration signal to generate a current command signal indicative of current applied to the magnetic coil to position the first and second heads.

4. The apparatus of claim 1, wherein the servo circuit selects the gain to minimize error in the positioning of the second head induced by the application of rotational vibration to the base deck.

5. The apparatus of claim 1, wherein the servo circuit comprises a processor having associated programming to:

set the gain to an initial value; and selectively vary the value of the gain while measuring an average position error signal indicative of error in the positioning of the second head to identify an optimum value of the gain.

6. The apparatus of claim 5, wherein the optimum gain is selected while the disc drive is operated in a rich vibrational environment wherein both rotational and translational vibration components are imparted to the disc drive.

7. The apparatus of claim 6, wherein the disc drive is mechanically coupled to a plurality of additional disc drives so that at least portions of the rotational and translational components are established by the operation of the additional disc drives.

8. The apparatus of claim 7, wherein the servo circuit determines the optimum value of the gain during manufacture of the disc drive.

9. The apparatus of claim 8, wherein the servo circuit determines the optimum value of the gain during subsequent operational use of the disc drive.

10. A disc drive, comprising:

a base deck;

a rotatable disc, supported by the base deck, having oppositely disposed first and second recording surfaces, the first recording surface having a circumferentially extending frequency pattern written at a constant frequency and the second recording surface having a plurality of servo fields interspersed with data fields;

a rotary actuator, supported by the base deck, which supports first and second heads adjacent the first and second recording surfaces, respectively;

a frequency modulation (FM) demodulator, operably coupled to the first head, which generates a rotational velocity signal indicative of application of rotational vibration to the base deck in relation to changes in frequency of a readback signal generated from the circumferentially extending frequency pattern;

a servo circuit, operably coupled to the second head and the FM demodulator, which controllably rotates the first and second heads with respect to the disc in response to servo information stored on the second recording surface and the rotational velocity signal from the FM demodulator, a gain block which applies a gain to the rotational velocity signal to generate an adjusted rotational velocity signal; and a differentiator block which differentiates the adjusted rotational velocity signal to generate a rotational acceleration signal indicative of a tangentially directed acceleration component of the rotational vibration applied to the base deck, wherein the servo circuit selects the gain to reduce error in the positioning of the second head induced by the application of rotational vibration to the base deck.

11. The disc drive of claim 10, wherein the servo circuit interrupts a data transfer operation between the data fields of the second recording surface and a host device associated with the disc drive when a magnitude of the rotational velocity signal exceeds a predetermined threshold.

12. The disc drive of claim 10, wherein the circumferentially extending frequency pattern on the first recording surface radially extends substantially from an innermost radius to an outermost radius of the disc.

13. A method for minimizing effects of rotational vibration on a disc drive comprising a base deck supporting a rotary actuator which supports first and second heads adjacent first and second disc recording surfaces, respectively, comprising steps of:

(a) operating the disc drive in a rich vibrational environment wherein both rotational and translational vibration components are imparted to the disc drive, (b) generating a readback signal as the first head reads a circumferentially extending frequency pattern previously written at a constant frequency to the first recording surface;

(c) applying frequency demodulation to the readback signal to derive a rotational velocity signal indicative of application of rotational vibration to the base deck in relation to changes in frequency of the readback signal; and (d) controlling the position of the first and second heads in relation to the rotational velocity signal, comprising steps of:

(d1) applying a gain to the rotational velocity signal to generate an adjusted rotational velocity signal;

(d2) differentiating the adjusted rotational velocity signal to generate a rotational acceleration signal indicative of a tangentially directed acceleration component of the rotational vibration applied to the base deck;

(d3) using the rotational acceleration signal to generate a current command signal which controls a magnitude of current applied to a coil of the actuator to control the position of the first and second heads.

(d4) setting the gain to an initial value;-

(d5) selectively varying the value of the gain while measuring an average position error signal indicative of error in the positioning of the second head to identify an optimum value of the gain; and (d6) using the optimum value of the gain in the applying step (d1).

14. The method of claim 13, further comprising a step of:

(e) interrupting a data transfer operation between the second recording surface and a host device associated with the disc drive when a magnitude of the rotational velocity signal exceeds a predetermined threshold.

15. The method of claim 13, wherein the operating step (a) further comprises mechanically coupling the disc drive to a plurality of additional disc drives so that at least portions of the rotational and translational components are established by operation of the additional disc drives.

* * * * *